US012651072B2

(12) United States Patent
Abdul Rahim et al.

(10) Patent No.: US 12,651,072 B2
(45) Date of Patent: Jun. 9, 2026

(54) VULNERABILITY MITIGATION USING A RUNTIME AGENT

(71) Applicant: Salesforce, Inc., San Francisco, CA (US)

(72) Inventors: Ibrahim Abdul Rahim, Bellevue, WA (US); David Wayne Smiley, Southwest Harbor, ME (US)

(73) Assignee: Salesforce, Inc., San Francisco, CA (US)

( * ) Notice: Subject to any disclaimer, the term of this patent is extended or adjusted under 35 U.S.C. 154(b) by 116 days.

(21) Appl. No.: 18/424,161

(22) Filed: Jan. 26, 2024

(65) Prior Publication Data

US 2025/0245343 A1 Jul. 31, 2025

(51) Int. Cl.
*G06F 21/00* (2013.01)
*G06F 21/53* (2013.01)
*G06F 21/57* (2013.01)

(52) U.S. Cl.
CPC ............ *G06F 21/577* (2013.01); *G06F 21/53* (2013.01); *G06F 2221/033* (2013.01)

(58) Field of Classification Search
CPC ... G06F 21/577; G06F 21/53; G06F 2221/033
See application file for complete search history.

(56) References Cited

U.S. PATENT DOCUMENTS

| | | | |
|---|---|---|---|
| 10,423,793 B2 * | 9/2019 | Madou | G06F 11/3612 |
| 12,517,806 B2 * | 1/2026 | Bartling | G06F 11/3612 |
| 2019/0108342 A1 * | 4/2019 | Conikee | G06F 21/577 |
| 2021/0055977 A1 * | 2/2021 | Lisuk | H04L 67/133 |
| 2021/0056201 A1 * | 2/2021 | Eftekhari Roozbehani | |
| | | | G06F 21/566 |

* cited by examiner

*Primary Examiner* — Ghazal B Shehni
(74) *Attorney, Agent, or Firm* — Holland & Hart, LLP.

(57) ABSTRACT

A runtime agent that is executable on a virtual machine may obtain one or more identifiers that correspond to one or more software classes from a first configuration file that is configured for the runtime agent. The runtime agent may monitor for loading of the one or more software classes by a first computer program that is being executed on the virtual machine. Further, the runtime agent may execute one or more actions based on detecting the loading of the one or more software classes by the first computer program where the one or more actions may impact the execution of the first computer program on the virtual machine.

20 Claims, 10 Drawing Sheets

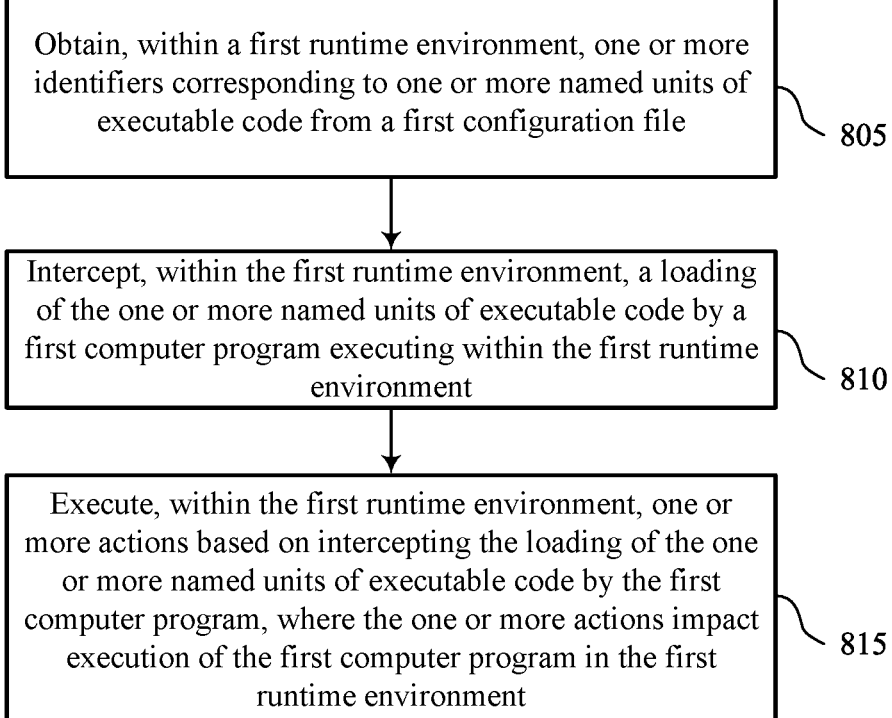

Obtain, within a first runtime environment, one or more identifiers corresponding to one or more named units of executable code from a first configuration file    805

Intercept, within the first runtime environment, a loading of the one or more named units of executable code by a first computer program executing within the first runtime environment    810

Execute, within the first runtime environment, one or more actions based on intercepting the loading of the one or more named units of executable code by the first computer program, where the one or more actions impact execution of the first computer program in the first runtime environment    815

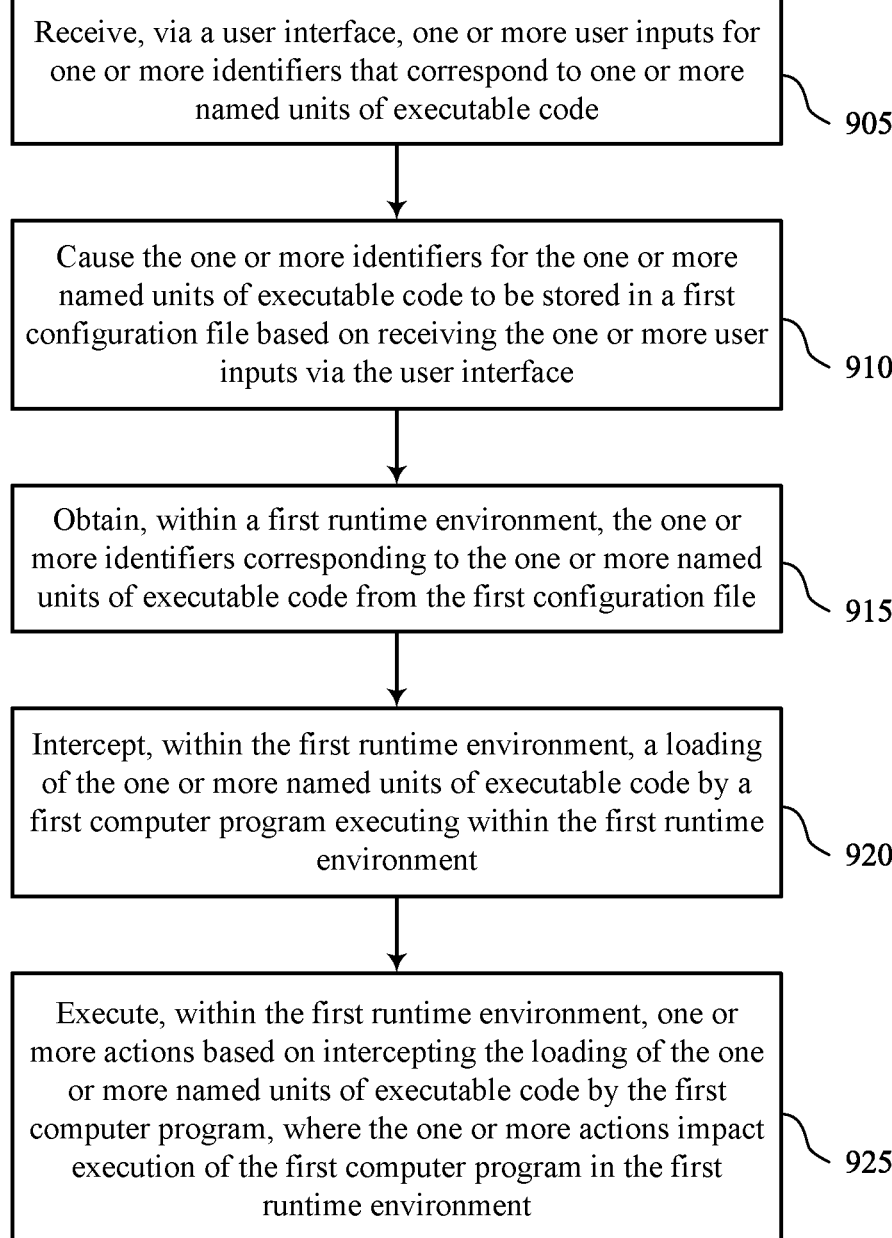

Receive, via a user interface, one or more user inputs for one or more identifiers that correspond to one or more named units of executable code ⟍ 905

Cause the one or more identifiers for the one or more named units of executable code to be stored in a first configuration file based on receiving the one or more user inputs via the user interface ⟍ 910

Obtain, within a first runtime environment, the one or more identifiers corresponding to the one or more named units of executable code from the first configuration file ⟍ 915

Intercept, within the first runtime environment, a loading of the one or more named units of executable code by a first computer program executing within the first runtime environment ⟍ 920

Execute, within the first runtime environment, one or more actions based on intercepting the loading of the one or more named units of executable code by the first computer program, where the one or more actions impact execution of the first computer program in the first runtime environment ⟍ 925

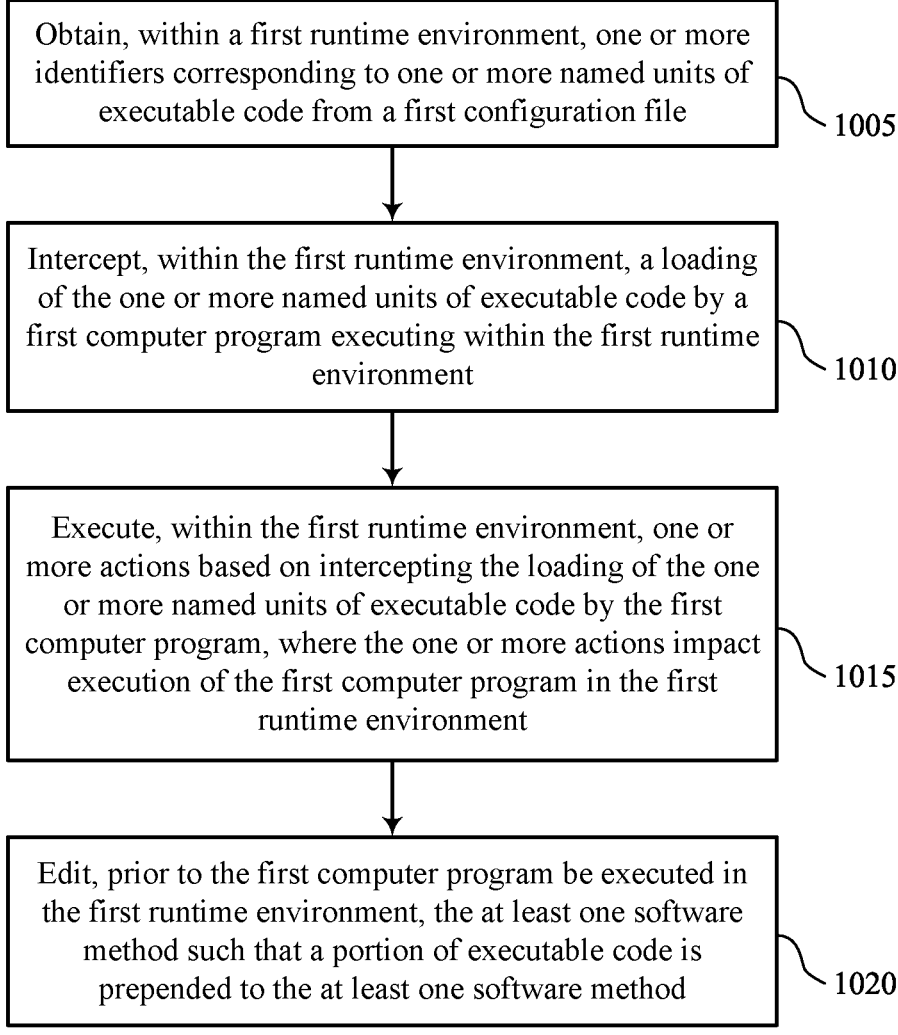

Obtain, within a first runtime environment, one or more identifiers corresponding to one or more named units of executable code from a first configuration file        1005

Intercept, within the first runtime environment, a loading of the one or more named units of executable code by a first computer program executing within the first runtime environment        1010

Execute, within the first runtime environment, one or more actions based on intercepting the loading of the one or more named units of executable code by the first computer program, where the one or more actions impact execution of the first computer program in the first runtime environment        1015

Edit, prior to the first computer program be executed in the first runtime environment, the at least one software method such that a portion of executable code is prepended to the at least one software method        1020

VULNERABILITY MITIGATION USING A RUNTIME AGENT

FIELD OF TECHNOLOGY

The present disclosure relates generally to software systems, and more specifically to vulnerability mitigation using a runtime agent.

BACKGROUND

A cloud platform (i.e., a computing platform for cloud computing) may be employed by multiple users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

In some examples, modern software applications or programs may be built on numerous open-source dependencies, which can introduce vulnerabilities. These vulnerabilities may be published as common vulnerabilities and exposures (CVEs), which identify specific vulnerabilities in a software application or program. Patching these vulnerabilities can be costly or introduce risk. Further, a computer program may not include the code inside a dependency that applies to a vulnerability, but such indication may be relatively difficult to prove to a compliance organization.

BRIEF DESCRIPTION OF THE DRAWINGS

FIGS. 8 through 10 show flowcharts illustrating methods that support vulnerability mitigation using a runtime agent in accordance with aspects of the present disclosure.

DETAILED DESCRIPTION

Figure 1:
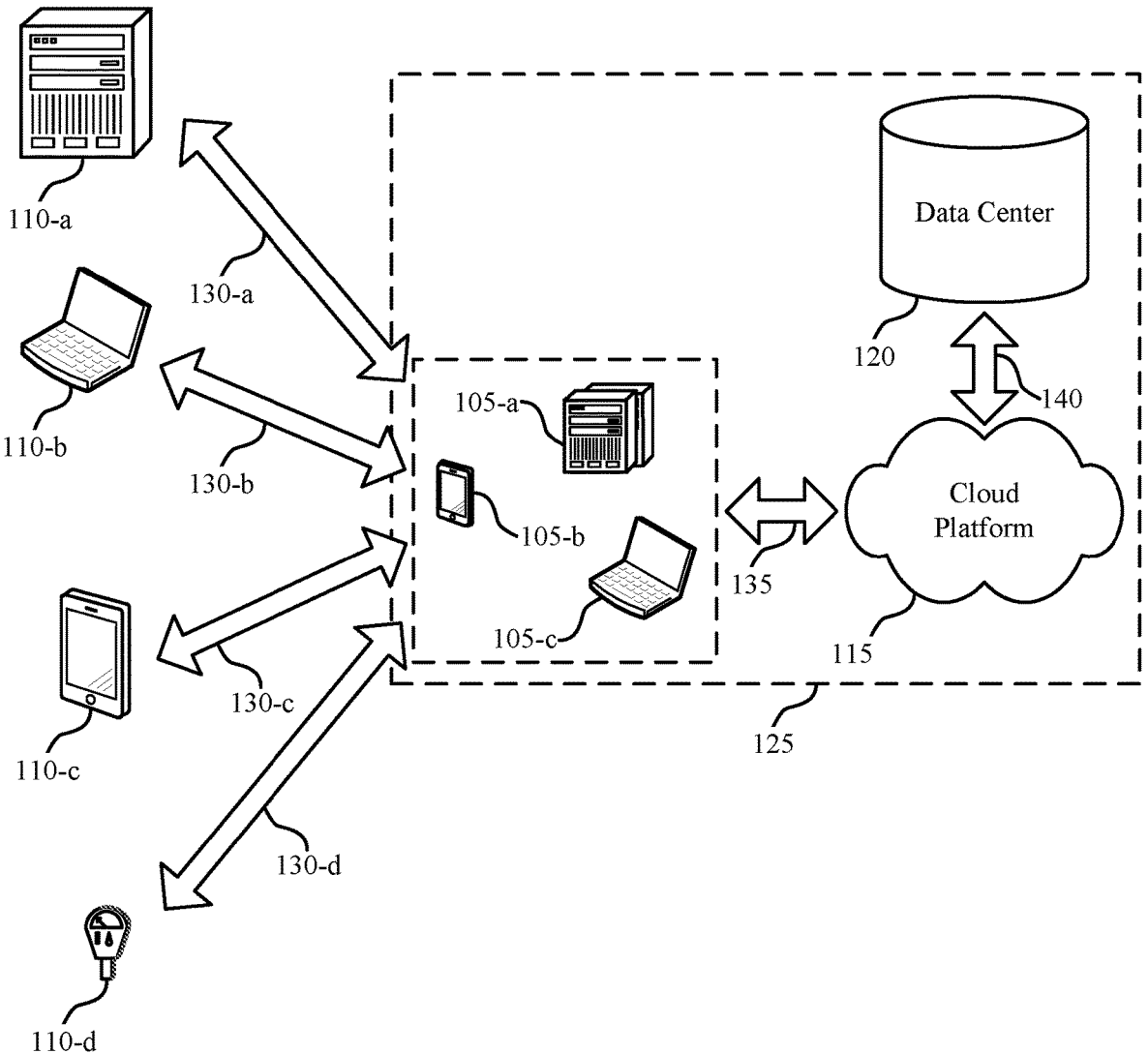
FIGS. 1 and 3 show examples of computing systems that support vulnerability mitigation using a runtime agent in accordance with aspects of the present disclosure.

Modern software development often relies on open-source dependencies, which can introduce vulnerabilities into a system. These vulnerabilities may be identified and published in common vulnerabilities and exposures (CVEs)

that can indicate information about weaknesses (e.g., vulnerabilities) in the software. However, patching these vulnerabilities may be a complex and time-consuming process, especially when dealing with a relatively large quantity of dependencies. Further, it may be challenging to determine if a particular dependency is actually being used in a vulnerable way. For example, in some cases, a respective dependency may not be used in a vulnerable way and patching the respective dependency may lead to inefficient and unnecessary patching efforts. Further, a patch to a respective dependency may be unavailable, thus preventing the respective dependency from being patched to resolve a vulnerability. Additionally, or alternatively, submitting deviation requests to a governance, risk, and compliance (GRC) committee, may be ineffective or unreliable. For example, a GRC committee might be unable to approve a deviation request or the approval may be for a relatively limited amount of time. Further, if a deviation request indicating that a computer program refrains from using a vulnerable dependency is invalid, the system may remain vulnerable.

Thus, the techniques of the present disclosure describes an agent (e.g., a runtime agent) of a runtime environment (e.g., a virtual machine) intercepting the loading of one or more named units of executable code (e.g., classes, methods, functions, or any combination thereof) by a computer program executed within the runtime environment and blocks them accordingly. Further, the techniques of the present disclosure may allow users to intercept vulnerable code, block the vulnerable code, or both while refraining from impairing the operation of the runtime environment. For example, the runtime agent may read a configuration file that lists one or more classes, methods, functions, or any combination thereof that have known vulnerabilities such that the runtime agent can block the listed classes, methods, and functions before execution. Additionally, or alternatively, the configuration file may indicate for a message to be logged, thus allowing operators to be aware of an issue while refraining from impairing the operation of a computer program and allowing the computer program to continue to function. Further, service owners of computer programs may be capable of protecting applications as well as minimizing, reducing, or delaying resource overhead associated with patching vulnerabilities. Thus, the runtime agent may provide an efficient and reliable way to mitigate some vulnerabilities in open-source dependencies for a computer program, avoiding or delaying the cost, effort, and resource overhead associated with patching.

Additionally, or alternatively, the techniques of the present disclosure may enable a service provider the capability of updating a configuration file to add or remove named units of executable code (e.g., classes, methods, functions), providing an enhanced flexibility in managing vulnerabilities. Further, in some cases, a configuration file may be associated with multiple computer programs, allowing for centralized control and management of vulnerabilities across different software systems. In some other cases, each computer program may be associated with a respective configuration file. Further, in some examples, a computing system may store the identifiers corresponding to the software classes within a database, enabling a runtime agent the capability of retrieving and managing the vulnerability information from CVEs as additional CVEs are released and patches are implemented. Therefore, the techniques of the present disclosure may provide software developers, service owners, or other users with the capability of mitigating vulnerabilities in open-source dependencies to enhance the security of a computer program or application.

Aspects of the disclosure are initially described in the context of an environment supporting an on-demand database service. Additional aspects of the disclosure are described with reference to computing systems and a process flow. Aspects of the disclosure are further illustrated by and described with reference to apparatus diagrams, system diagrams, and flowcharts that relate to vulnerability mitigation using a runtime agent.

FIG. 1 illustrates an example of a system 100 for cloud computing that supports vulnerability mitigation using a runtime agent in accordance with various aspects of the present disclosure. The system 100 may be an example of a computing system that includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-*a*), a smartphone (e.g., cloud client 105-*b*), or a laptop (e.g., cloud client 105-*c*). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level, and may not have access to others.

Contacts 110 may interact with the cloud client 105 in person or via phone, email, web, text messages, mail, or any other appropriate form of interaction (e.g., interactions 130-*a*, 130-*b*, 130-*c*, and 130-*d*). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-*a*), a laptop (e.g., contact 110-*b*), a smartphone (e.g., contact 110-*c*), or a sensor (e.g., contact 110-*d*). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135, and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

The system 100 may be an example of a multi-tenant system. For example, the system 100 may store data and provide applications, solutions, or any other functionality for multiple tenants concurrently. A tenant may be an example of a group of users (e.g., an organization) associated with a same tenant identifier (ID) who share access, privileges, or both for the system 100. The system 100 may effectively separate data and processes for a first tenant from data and processes for other tenants using a system architecture, logic, or both that support secure multi-tenancy. In some examples, the system 100 may include or be an example of a multi-tenant database system. A multi-tenant database system may store data for different tenants in a single database or a single set of databases. For example, the multi-tenant database system may store data for multiple tenants within a single table (e.g., in different rows) of a database. To support multi-tenant security, the multi-tenant database system may prohibit (e.g., restrict) a first tenant from accessing, viewing, or interacting in any way with data or rows associated with a different tenant. As such, tenant data for the first tenant may be isolated (e.g., logically isolated) from tenant data for a second tenant, and the tenant data for the first tenant may be invisible (or otherwise transparent) to the second tenant. The multi-tenant database system may additionally use encryption techniques to further protect tenant-specific data from unauthorized access (e.g., by another tenant).

Additionally, or alternatively, the multi-tenant system may support multi-tenancy for software applications and infrastructure. In some cases, the multi-tenant system may maintain a single instance of a software application and architecture supporting the software application in order to serve multiple different tenants (e.g., organizations, customers). For example, multiple tenants may share the same software application, the same underlying architecture, the same resources (e.g., compute resources, memory resources), the same database, the same servers or cloud-based resources, or any combination thereof. For example, the system 100 may run a single instance of software on a processing device (e.g., a server, server cluster, virtual machine) to serve multiple tenants. Such a multi-tenant system may provide for efficient integrations (e.g., using application programming interfaces (APIs)) by applying the integrations to the same software application and underlying architectures supporting multiple tenants. In some cases, processing resources, memory resources, or both may be shared by multiple tenants.

As described herein, the system 100 may support any configuration for providing multi-tenant functionality. For example, the system 100 may organize resources (e.g., processing resources, memory resources) to support tenant isolation (e.g., tenant-specific resources), tenant isolation within a shared resource (e.g., within a single instance of a resource), tenant-specific resources in a resource group, tenant-specific resource groups corresponding to a same subscription, tenant-specific subscriptions, or any combination thereof. The system 100 may support scaling of tenants within the multi-tenant system, for example, using scale triggers, automatic scaling procedures, scaling requests, or any combination thereof. In some cases, the system 100 may implement one or more scaling rules to enable relatively fair sharing of resources across tenants. For example, a tenant may have a threshold quantity of processing resources, memory resources, or both to use, which in some cases may be tied to a subscription by the tenant.

In some examples, the system 100 may enable techniques for mitigating vulnerabilities (e.g., preventing exposure to vulnerabilities or minimizing the impact of the vulnerabilities) in open-source dependencies for applications of the system 100. However, such techniques may be relatively inefficient and unreliable. For example, the process of manually researching and interpreting CVEs that identify and indicate software vulnerabilities may be relatively time-consuming and error-prone, especially when dealing with a large quantity of dependencies. Therefore, the system 100 may experience an increase in delays in identifying and addressing vulnerabilities, thus leaving the system 100 exposed to potential exploits. Additionally, or alternatively, determining if a particular dependency is actually being used in a vulnerable way may be relatively difficult, resulting in inefficient and potentially unnecessary patching efforts. Moreover, mitigation controls such as updating to the latest version or submitting deviation requests may be ineffective or unreliable and may consume computing resources, and in some cases, may leave the system 100 vulnerable to known exploits.

Therefore, the techniques described herein enable a runtime environment of the system 100 with mitigation techniques. For example, the runtime environment (e.g., a virtual machine) may use a runtime agent in accordance with the techniques of the present disclosure. For example, the runtime agent may be configured to intercept the loading named units of executable code (e.g., associated with vulnerabilities) during runtime. In some cases, the runtime agent may block vulnerable behavior, during runtime, based on a configuration file that lists software classes, methods, functions, or any combination thereof (e.g., named units of executable code) associated with known vulnerabilities. Therefore, the use of a runtime agent may provide more efficient and reliable techniques to identify and address vulnerabilities in open-source dependencies. Further, the runtime agent may be capable of updating the configuration file to allow for flexibility in managing vulnerabilities. Therefore, users may add or remove software classes as additional vulnerabilities are discovered or as changes are made to the dependencies. Thus, the system 100 may remain protected against the latest security threats without any unnecessary patching efforts and while limiting or delaying resource overhead associated with patching efforts.

For example, a software development team working on an application and may utilize a runtime agent to mitigate vulnerabilities in the open-source dependencies of the respective application. By configuring the runtime agent with a configuration file that lists classes, methods, or functions associated with known vulnerabilities, the team may be capable of ensuring that any identified vulnerable behavior is blocked during runtime. As such, the runtime agent may provide relatively reliable protection and security for the application. Additionally, or alternatively, the team may update the configuration file to add or remove software classes, methods, or functions, allowing for flexibility in managing vulnerabilities while limiting impacts on the functionality of the application. Therefore, the software development team may be capable of using the runtime agent to provide additional security to an application while reducing the time and effort required for patching to ensure the security of their system (e.g., the system 100).

As described herein, the system 100 may be a multi-tenant environment. As such, each tenant or a set of tenants may be allocated to a respective set of physical or logical computing environments. In such cases, each physical or logical computing environment may have a respective one or more virtual machines on which applications supporting tenant services are executed. The techniques described herein may be applicable to each virtual machine such that a runtime agent may mitigate or limit vulnerabilities. As such, each tenant or environment may be configured with a respective or shared configuration file for interception of loading of named units of executable code. Thus, each tenant, environment, etc. may have different or shared configuration file depending on the applications and/or dependencies used by the applications that are executable by the runtime environment (e.g., virtual machines). Thus, the techniques described herein are flexible and configurable, depending on the environment and/or applications.

It should be appreciated by a person skilled in the art that one or more aspects of the disclosure may be implemented in a system 100 to additionally or alternatively solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
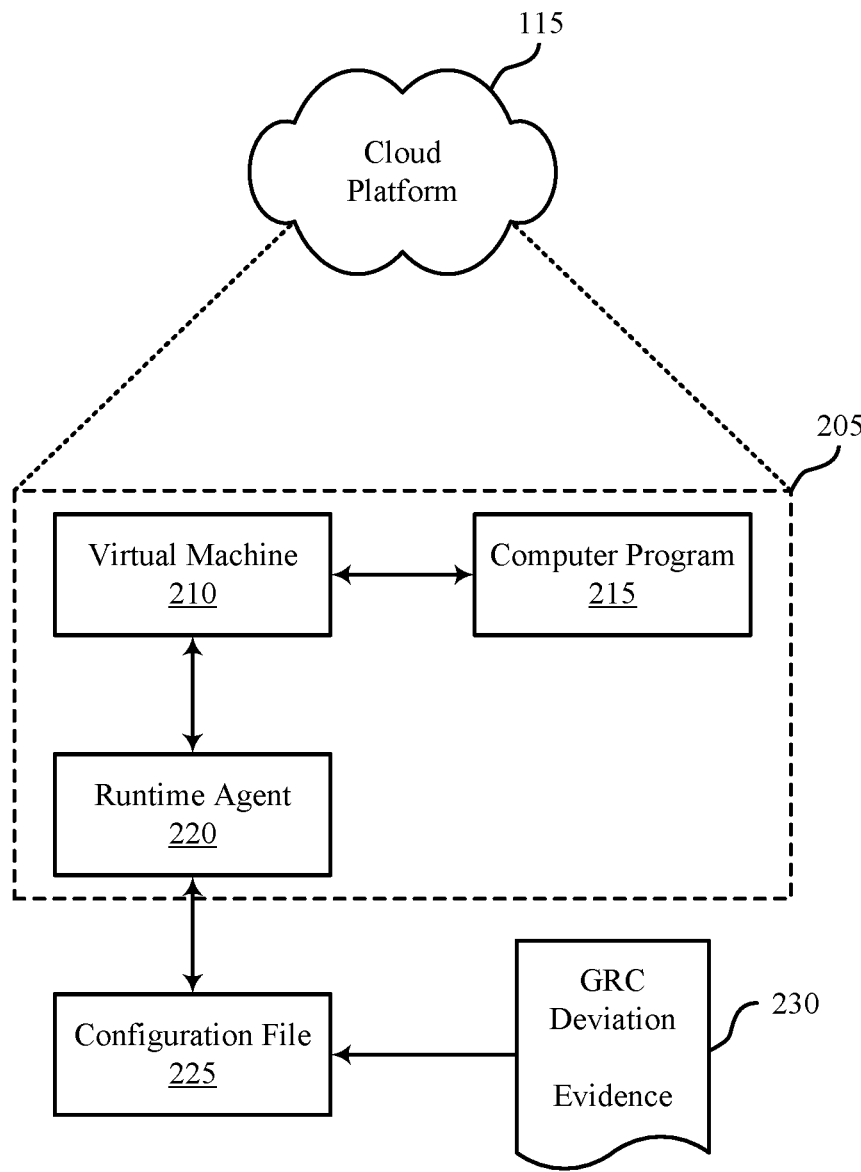

FIG. 2 shows an example of a computing system 200 that supports vulnerability mitigation using a runtime agent in accordance with aspects of the present disclosure. In some examples, the computing system 200 may be implemented by or may implement the system 100. For example, the computing system 200 may include a cloud platform 115, which may be an example of the cloud platform 115 described with reference to FIG. 1. Further, the computing system 200 may include or host a runtime environment 205 that includes virtual machine 210, a computer program 215, and a runtime agent 220, which may be hosted on the cloud platform 115. In some cases, the cloud platform 115 may be an example of a multi-tenant system or the cloud platform 115 may be for a respective tenant of a multi-tenant system. Additionally, or alternatively, the runtime environment 205 may be an example of a runtime environment allocated for a particular tenant (or subset of tenants) of a multi-tenant system. The computing system 200 may also include a configuration file 225 and governance, risk, and compliance (GRC) deviation evidence 230 which may be inputs for the computing system 200. For example, the GRC deviation evidence 230 may be an input for the configuration file 225 and the configuration file 225 may be an input for the runtime agent 220.

In some examples of the computing system 200, users may use a virtual machine 210 of the runtime environment 205 to execute one or more computer programs 215 within the virtual machine 210 of the runtime environment 205. The runtime environment 205 may be an example of an environment where the one or more computer programs 215 are executed. In some cases, the virtual machine 210 may operate within a cloud platform 115 as described elsewhere herein with reference to FIG. 1. Further, in some examples, the computer programs 215 executed by the virtual machine 210 may run on multiple open-source software computer programs 215 or libraries. That is, a computer program 215 may have one or more open-source software dependencies (e.g., libraries) that make up or are used for the execution of the computer program 215. For example, the computer program 215 may use one or more open-source computer programming language libraries that can include one or more software classes, one or more software methods included within the respective one or more software classes, one or more software functions, or any combination thereof. Further, it should be understood by one of ordinary skill in the art that in object-oriented programming a class may be a template for creating an object and the class can include one or more methods that define operations for the object. For example, a class may define a temple for an object that an application may use to parse data and a method of the class may define the operations for parsing the data. Further, it should be understood by one of ordinary skill in the art that a function may define a set of operations to be performed in a specific sequence to perform a specific task. Moreover, open-source software libraries may be a collection of objects of classes and functions that can be used individually or collectively to perform tasks.

In some examples, an open-source software library that a computer program 215 may be dependent on may have one or more vulnerabilities or security issues that can result in exposing the computer program 215, the virtual machine 210 executing the computer program 215, the cloud platform 115 running the virtual machine 210, or any combination thereof to security risks or vulnerabilities. Such vulnerabilities may be outlined within a CVE that is publicly published to identify vulnerability and security issues in open-source software. To fix such vulnerabilities, updates to the one or more open-source software may be developed. As such, to mitigate the vulnerabilities of a computer program 215, a developer or service provider may patch the computer program 215. Patching a computer program 215 may refer to the process of updating or fixing software to address vulnerabilities, bugs, or other issues. However, in some cases, patches may be currently unavailable or may be disfavored due to impacts on other portions of an application or dependencies. In some other cases, upgrading to a newer version of the software can also be computationally expensive, especially when dealing with major version changes. Additionally, or alternatively, the process of patching may be relatively time-consuming, requiring short-term mitigation controls to address vulnerabilities while waiting for patches to be completed or to become available. Further, there may be some compatibility issues when attempting to upgrade the computer program 215, thus introducing risks to the system. For example, an authentication portion of a computer program may be incompatible with an upgraded dependency therefore potentially leaving the computer program 215 open to exposures.

In addition, large and complex computer programs 215 with one or more external dependencies may also pose additional challenges for patching. Further, some computer programs 215 may be within a maintenance mode software which may be more difficult to update due to limited functionality and access of the maintenance mode and the risk of disrupting the computer program 215. For example, since the availability of maintenance modes in computer programs 215 may be crucial during maintenance or updates to the computer program 215, updates to the computer program 215 can disrupt the operations of the computer program 215. Therefore, patching a computer program 215 may be inefficient. However, in some cases, a computer program 215 may not use a vulnerable class thus making patching the computer program 215 unnecessary. Moreover, it may be difficult to prove if a particular open-source software dependency is being used in a vulnerable way. For example, a CVE may define that a specific class of an open-source software library as vulnerable and the computer program 215 may not use the vulnerable class in the execution of the computer program 215 or may not use the class in a manner that renders the class vulnerable (e.g., may not use vulnerable functions or methods). Thus, mitigating open-source software vulnerabilities may include users submitting deviation requests or patching a computer program 215.

As such, a deviation request may state that the computer program 215 should be exempt from applying the corresponding patch or mitigation control based on the computer program 215 not using the vulnerable aspect of a method or class. However, the effectiveness of deviation requests may be questionable. For example, these requests may be based on subjective interpretations of CVEs and may lack proof of non-vulnerability of a computer program 215. Therefore, deviation requests may be relatively difficult to prove. Further, the process of attempting to prove that something is not being used with a computer program 215 may be time-consuming and can divert resources from more effective security measures. Moreover, attempting to prove that something is not being used within the computer program 215 may be relatively difficult to achieve and such attempts to do so can find some evidence but may be unreliable. Additionally, or alternatively, users may have to submit additional deviation requests as additional vulnerable features are identified and discovered within CVEs. As such, the mitigation control of deviation requests may be relatively limited.

For example, the computer program 215 may have an open-source software dependency with a vulnerability identified within a CVE that pertains to the deserialization of untrusted or corrupted data, potentially leading to memory consumption beyond allowed constraints and causing out-of-memory issues within the computing system 200 (e.g., within the virtual machine 210 of the cloud platform 115). However, the computer program 215 may use the open-source software dependency in a way that refrains from using deserialization, and instead, the computer program 215 may use the open-source software dependency for serialization, which is the process of converting data into a specific format for storage or transmission. Using the current techniques, to mitigate the vulnerability of the open-source software dependency, a developer may either patch the computer program 215 with an updated version of the open-source software dependency or submit a deviation request to a governance, risk, and compliance (GRC) committee. However, as discussed herein, such techniques may be relatively inefficient, unreliable, unsecure, time consuming, result in an increase in risk without proper testing, or in the case of deviation requests, questionable.

Therefore, the techniques of the present disclosure may use a runtime agent 220 of the virtual machine 210 when running the computer program 215 within the runtime environment 205 to perform more efficient and reliable vulnerability mitigations. In some examples, the runtime agent 220 may be an example of an agent of the virtual machine 210 within the runtime environment 205 that is used to enhance the functionality and control of the virtual machine 210. Virtual machine 210 agents may perform tasks such as monitoring, security enforcement, configuration management, and resource optimization while computer programs 215 are running on the virtual machine 210. Therefore, the agents may enable administrators or service owners to efficiently manage and secure virtualized environments within the virtual machine 210 and improve the performance, compliance, and operational efficiency of the virtual machine 210 and the computer programs 215 running on the virtual machine 210. Thus, the runtime agent 220 may enable administrators or service owners of a respective computer program 215 to execute the computer program 215 in a secure manner.

To perform such vulnerability mitigation, an administrator or a service owner may configure runtime agent 220 of the runtime environment 205 with a configuration file 225 that includes one or more identifiers corresponding to one or more named units of executable code (e.g., one or more software classes, methods, functions, or any combination thereof) that have or may be associated with some vulnerability. It should be understood by one having ordinary skill in the art that a named unit of executable code may be a portion of executable code that is assigned a respective name that can be used to call or execute the portion of executable code. Therefore, the configuration file 225 may list one or more classes, methods, or functions from open-source software that have been indicated by a CVE as vulnerable or posing some security risk. Thus, the runtime agent 220 may use the configuration file 225 to monitor the computer program 215 at runtime to determine if a class, method, or function indicated or listed within the configuration file 225 (e.g., via the identifier that corresponds to the class, method, or function) is to be loaded and executed. As such, the runtime agent 220 may use the configuration file 225 to block and prevent the execution of vulnerable classes, methods, functions, or any combination thereof. In some cases, one or more computer programs 215 may use the same configuration file 225. In some other cases, a first computer program 215 and a second computer program 215 may be associated with separate configuration files 225. Therefore, in such cases, the runtime agent 220 may be configured with a set of configuration files 225 for a set of computer programs 215.

For example, the runtime agent 220 may detect that a computer program 215 executed within the virtual machine 210 of the runtime environment 205 is attempting to load and execute at least one of the items (e.g., classes, methods, or functions) identified in the configuration file 225 during the runtime or boot of the computer program 215. As such, to prevent the computer program 215 from loading and executing such vulnerable class, method, or function within the virtual machine 210, the runtime agent 220 may perform one or more actions. In some examples, the runtime agent may throw an exception to prevent the execution of a vulnerable class listed within the configuration file 225. Additionally or alternatively, if the runtime agent 220 detects that the computer program 215 is attempting to load and execute a vulnerable class (or method or function) listed in the configuration file 225, the runtime agent 220 may log the stack trace that led to the vulnerable class being called. As such, the configuration file 225 may allow the runtime agent 220 to effectively secure the computer program 215, the virtual machine 210 executing the computer program 215, the cloud platform 115 hosting the virtual machine 210, or any combination thereof.

In some examples, the configuration file 225 may be configured by an administrator or a service owner of the computer program 215, the virtual machine 210, or of the cloud platform 115. In some cases, the administrator or service owner may generate the GRC deviation evidence 230 to provide evidence that the computer program 215 refrains from using a class, method, or function that has a vulnerability indicated in a CVE. That is, the GRC deviation evidence 230 may provide evidence that the computer program 215 does not use a feature that is indicated as vulnerable via a CVE. Thus, based on the GRC deviation evidence 230, the class, method, or function that has a vulnerability indicated in a CVE may be added to the configuration file 225.

Users may generate the GRC deviation evidence 230 by showing a GRC committee source code of the computer program 215 to show that the computer program 215 refrains from executing a vulnerable class, method, or function. However, as an extra level of security, such classes, methods, or functions may be added to the configuration file 225. For example, the computer program 215 may perform an unexpected action that may result in calling a vulnerable class, method, or function. Therefore, the runtime agent 220 may detect such call and prevent the execution of the vulnerable class, method, or function. To prevent such call, as discussed herein, the runtime agent 220 may throw an exception to block the vulnerability. The exception may result in displaying an error message within a user interface of the computer program 215. By displaying an error message, a user of the computer program 215 may be capable of performing a different action. Therefore, the error message may prevent the computer program 215 from crashing. For example, if the exception ended the execution of the computer program 215 users may experience an increase in delays. As such, the runtime agent 220 may prevent the execution of the vulnerable classes, methods, or functions without causing the entire computer program 215 to crash.

In some cases, a CVE may list a method of a class as being vulnerable and the computer program 215 may use the respective class but may refrain from using the vulnerable method indicated by the CVE. As such, to enable the virtual machine 210 the capability to use the non-vulnerable methods of the respective class, the runtime agent 220 may edit the vulnerable method prior to the execution of the computer program 215 to prevent the loading and execution of the method during the runtime of the computer program 215. That is, the runtime agent 220 or another component of the virtual machine 210 may add code (e.g., bytecode) to the beginning of the method that throws an exception before any part of the execution of the method. Further, since the computer program 215 may refrain from using the vulnerable method, the runtime agent 220 may refrain from reading or interpreting the code of the vulnerable method prior to editing the code to save time. In some other cases, the runtime agent 220 may be capable of blocking specific usage patterns. For example, a class, method, or function may be vulnerable when a user uses a respective set of inputs or a delineated series of functions or actions in a delineated order. As such, the runtime agent 220 may be configured to detect when the respective set of inputs are being used for a respective class, method, or function (or when a series of functions are being used in the delineated order) and then blocking the respective class, method, or function accordingly. For example, a method of a class may be safe when being used to read a configuration file but may be unsafe (e.g., have some vulnerability or security risk) when used in an unexpected manner, such as writing to or editing the configuration file or if an external request calls the vulnerable method resulting in an external provided input to trigger the runtime agent 220 to block the method from being executed. For example, a method of a class may be used to read a file that includes user passwords and permissions for a user. Therefore, if the method of the class has a vulnerability that results in a change being made to the file when the file is read or accessed, the password for one or more users may change or the permissions for one or more users may change. For example, the change may result in assigning a user 'root' access to a system or changing the passwords of one or more users to a default password which can result in a security breach. Thus, the techniques of the present disclosure may enable users to utilize the runtime agent 220 to avoid such security exposures.

Additionally, or alternatively, as discussed herein, the runtime agent 220 may also log the stack trace that resulted in the potential execution of a class, method, or function listed within the configuration file 225. For example, as discussed herein, the design of a computer program 215 may be such that the computer program 215 refrains from using a respective class under normal operation. As such, if the computer program 215 attempts to call the respective class (e.g., a vulnerable class listed and identified within the configuration file 225), the virtual machine 210 may determine such operation as an unexpected behavior of the computer program 215. Therefore, the runtime agent 220 may block the class to prevent the computer program 215 from being exposed to a vulnerability and log the stack trace leading up to the computer program attempting to make use of the vulnerable class.

A stack trace may show an order of class, method, and function calls and operations executed during runtime of the computer program 215. As such, the logged stack trace may show the order of operations that leads to the potential execution of a class (or method or function) listed within the configuration file 225. In some cases, a user may manually examine the logged stack trace to determine why the computer program 215 called the class. Further, in some examples, the user may determine that there is a bug or issue within the computer program 215 that resulted in the computer program 215 attempting to use the vulnerable class. In some other examples, the user may discover one or more security issues with the computer program 215 that led to the computer program 215 attempting to use the vulnerable class. As such, the user (e.g., a developer of the computer program 215 or an administrator of the computer program 215) may address the security issues accordingly to ensure the security of the computer program 215 is maintained.

In some other cases, the virtual machine 210 may be capable of examining the logged stack traces, without human input or intervention, to determine how the vulnerable class is called. For example, the virtual machine 210 may use an artificial intelligence (AI) or machine learning (ML) model (AI/ML model) hosted within the virtual machine 210 or within the cloud platform 115 to examine the stack trace. In some examples, the AI/ML model may be used to detect patterns across multiple stack traces. For example, a specific action or series of actions within the computer program 215 may lead to the computer program 215 attempting to use the vulnerable class. As such, the AI/ML model may detect such pattern and notify a user (e.g., an administrator, developer, or service owner of the computer program 215) of such issues or security risks. In some other examples, the virtual machine 210 may simply notify the user of the last action within the stack trace that led to the runtime agent 220 blocking the vulnerable class.

However, in some cases, the computer program 215 may use a class, method, or function of an open-source software dependency listed in a CVE but patching the computer program 215 may be time-consuming, expensive, or unavailable. For example, as discussed herein, a patch to an open-source software may be currently unavailable. In some cases, the patch to the computer program 215 may be incompatible with the vulnerable versions or are relatively large and thus may consume a relatively large quantity of resources and time due to the length of time to perform the patch to the computer program 215. As such, the runtime agent 220 may provide the computer program 215 short-term mitigation from vulnerabilities until a patch is made available or until resources for patching the computer program 215 are available. Therefore, the runtime agent 220 may be capable of providing more efficient, accurate, and trustworthy vulnerability mitigation for the runtime environment 205 by preventing unnecessary patching, securing a computer program 215 before the installation of a patch, or both. Further description of the use of the runtime agent 220 of a virtual machine 210 within the runtime environment 205 that may be hosted within the cloud platform 115 may be described elsewhere herein including with reference to FIG. 3.

Figure 3:
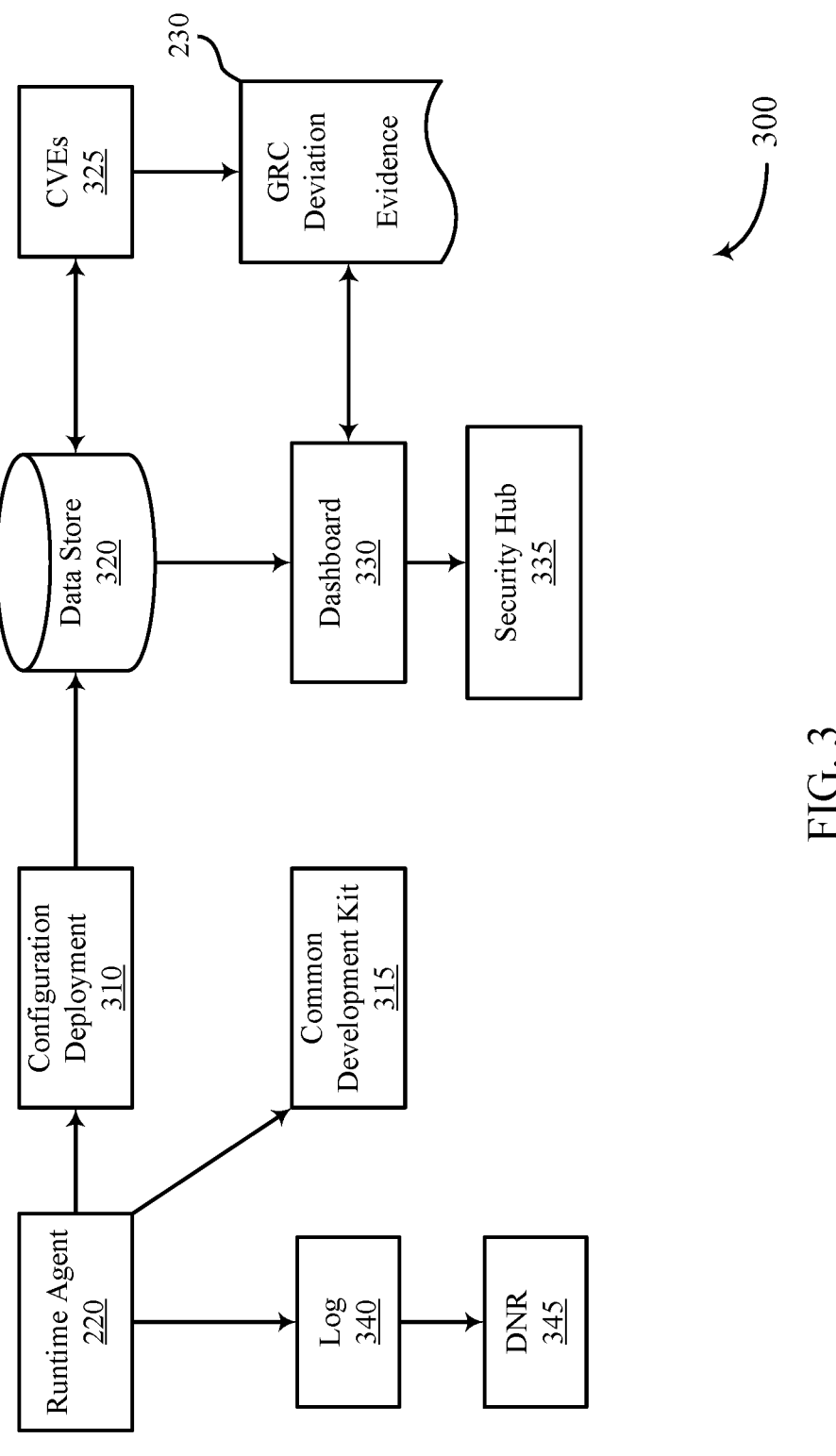

FIG. 3 shows an example of a computing system 300 that supports vulnerability mitigation using a runtime agent in accordance with aspects of the present disclosure. In some examples, the computing system 300 may be implemented by or may implement the system 100, the computing system 200, or both. For example, the computing system 300 may include a runtime agent 220, which may be an example of the runtime agent 220 of the virtual machine 210 which may be a part of a cloud platform 115 described with reference to FIG. 1 and FIG. 2. Further, the computing system 300 may include, a configuration deployment 310, a common development kit 315, a data store 320, one or more CVEs 325, GRC deviation evidence 230, a dashboard 330, a security hub 335, a log 340, and a detection and response (DNR) component 345. In some cases, computing system 300 may be executed on a cloud platform 115 which may be an example of a multi-tenant system or the cloud platform 115 may be for a respective tenant of a multi-tenant system.

In some cases, the runtime agent 220 may also manage and control the common development kit 315 of the computing system 300. A common development kit 315 may be used within software development environments (e.g., such as the computing system 300) to develop applications in one or more computer programming languages. The common development kit 315 may include one or more developer tools such as a compiler, interpreter, debugger, and documentation generators. Further, the common development kit 315 may provide a runtime environment which includes the tools and libraries to execute computer programs. The common development kit 315 may also include or access the classes, libraries, and open-source software dependencies used by a virtual machine to execute one or more computer programs. As such, the runtime agent 220 may use the configuration deployment 310 and the common development kit 315 to manage the execution of computer programs within a virtual machine.

In some examples, as described herein, vulnerabilities or security risks may be identified in one or more classes, libraries, or open-source dependencies managed by the configuration deployment 310, the common development kit 315, or both. Such vulnerabilities or security risks may be identified within one or more CVEs 325 which are described with reference to FIG. 2. The CVEs 325 may identify the vulnerabilities of classes, methods, and functions of open-source software such that service owners and administrators of applications and computer programs can ensure that their application or computer program is secure. In some examples, the vulnerable classes, methods, and functions may be stored within a data store 320 for easy access. In some cases, a user may manually examine a CVE 325 to determine what classes, methods, and functions are vulnerable. However, such examination may be relatively time-consuming, thus, it may be beneficial for CVEs 325 to directly indicate which classes, methods, and functions include vulnerabilities or security risks. For example, to support the techniques of the present disclosure, a user drafting or generating a CVE 325 may include a list of the classes, methods, and functions that include vulnerabilities or security risks. Thus, a virtual machine may be capable of parsing the CVE 325 and storing each class, method, and function listed within the CVE within the data store 320. Therefore, users would be able to determine which classes, methods, and functions have vulnerabilities or security risks while refraining from manually examining respective CVEs 325.

In some examples, after the publishing of one or more CVEs 325, a user (e.g., a developer, an administrator, a service owner) may provide some GRC deviation evidence 230 to a GRC committee to describe if any vulnerable classes, methods, or functions, are being used within a computer program or application. The GRC committee may be a committee within an organization, business, or company that focuses on ensuring that respective computer programs are secure and free from security risks and vulnerabilities while maintaining and following regulations (e.g., state regulations or laws, federal regulations or laws, national regulations or laws, international regulations). In some cases, the GRC deviation evidence 230 may be to prove that a computer program or application refrains from using a vulnerable class, method, or function. That is, the GRC deviation evidence 230 may assist in determining whether a patch to the computer program or application should be implemented. For example, if a computer program refrains from using a vulnerable class listed in a CVE 325, patching the computer program may be unnecessary thus resulting in an unnecessary consumption of time and computational resources.

In some cases, users may submit the GRC deviation evidence 230 to a dashboard 330 that is used to configure a configuration file for the runtime agent 220. For example, the runtime agent 220 may be configured to periodically obtain identifiers for software classes from a configuration file where the configuration file is periodically updated to add additional software classes or to remove software classes. That is, a user may use the dashboard 330 to configure which classes, methods, and functions to include in the configuration file for the runtime agent 220 to determine which classes, methods, or functions the runtime agent 220 should monitor for. For example, in some cases, due to the release and publications of additional CVEs 325 a user may add additional vulnerable classes to the configuration file. In some other cases, as users (e.g., developers or service owners) implement patches to a computer program, the runtime agent or users may remove classes, methods, or functions, which were vulnerable prior to the patch, from the configuration file. Users may also use dashboard 330 such that the runtime agent 220 may receive user inputs within the dashboard 330 that correspond to a user selecting or deselecting identifiers of classes, methods, or functions to be included within a configuration file. As such, the configuration file may be configured to periodically retrieve respective indications for software classes, methods, or functions from the data store 320. In some cases, the identifiers for software classes, methods or functions included in a configuration file may be based on the user inputs from the dashboard 330. Moreover, updates to a configuration file may be made prior to, during, or after a computer program is executed within a virtual machine.

Additionally, or alternatively, the dashboard 330 may be connected to a security hub 335 which may manage the security and data compliance of an application or computer program, of a virtual machine, or of a cloud platform. In some examples, the security hub 335 may include a threat and vulnerability management (TVM) component to determine how vulnerable a computer program may be if a computer program uses a vulnerable class, method, or function. Therefore, in some cases, the security hub 335 may assign priorities to the classes, methods, or functions listed within the dashboard 330. For example, a vulnerability of a first class may be associated with a higher security risk than a vulnerability of a second class. Thus, users (e.g., developers or service owners) may use such priorities to a patching order of such vulnerable classes, methods, or functions.

Further, in some examples, as virtual machines may execute multiple computer programs, the runtime agent 220 may obtain a second one or more identifiers that correspond to a second one or more software classes from a second configuration file that is associated with a second computer program. That is, the runtime agent 220 may be configured with more than one configuration file where each configuration file is associated with a respective application or computer program. In some other examples, a set of computer programs or applications may share a configuration file such that the runtime agent 220 monitors each computer program or application within the set of computer programs or applications for the loading of software classes listed in a configuration file. In some cases, the runtime agent 220 may monitor the set of computer programs or applications concurrently (e.g., via a parallel processing procedure) or sequentially, depending on a quantity of computer programs or applications that the kernel 305 executes at the same time.

Using the configuration file (or configuration files), the runtime agent 220 may monitor for the listed classes, methods, or functions and perform one or more actions based on detecting the loading of at least one class, method, or function. One of the actions may include the runtime agent 220 logging the stack trace of the computer program within a log 340 of the virtual machine. As described elsewhere herein with reference to FIG. 2, the virtual machine, a user, or both may then examine the log 340. Further, the runtime agent 220 may also execute a detection and response component 345 to block the execution of a vulnerable class, method, or function. For example, during runtime of a computer program the runtime agent 220 may detect the loading of a class indicated as being vulnerable by a CVE 325 based on the respective class being included within a configuration file configured in the dashboard 330 connected to the data store 320 and security hub 335. As such, the runtime agent 220 may log the stack trace within the log 340 of the virtual machine and use the detection and response component 345 to block the execution of a class, thus preventing the computer program from being exposed to a vulnerability or security risk. In some cases, the runtime agent 220 may execute the one or more actions based on a condition associated with a timestamp of a configuration file. For example, an administrator may wish to wait a set period of time after the GRC deviation evidence 230 is submitted (e.g., a week) before executing an action such as throwing an exception. Thus, there may be a condition that states that the computer program may refrain from throwing an exception until after a week of the creation of the configuration file or until a timestamp of the last update to the configuration file. Therefore, the runtime agent 220 may enable a virtual machine to execute computer programs without the risk of being exposed to known vulnerabilities identified in the CVEs 325 and without performing unnecessary patches to the computer program. Further descriptions of the use of the runtime agent 220 in accordance with the techniques of the present disclosure may be described elsewhere herein including with reference to FIG. 4.

Figure 4:
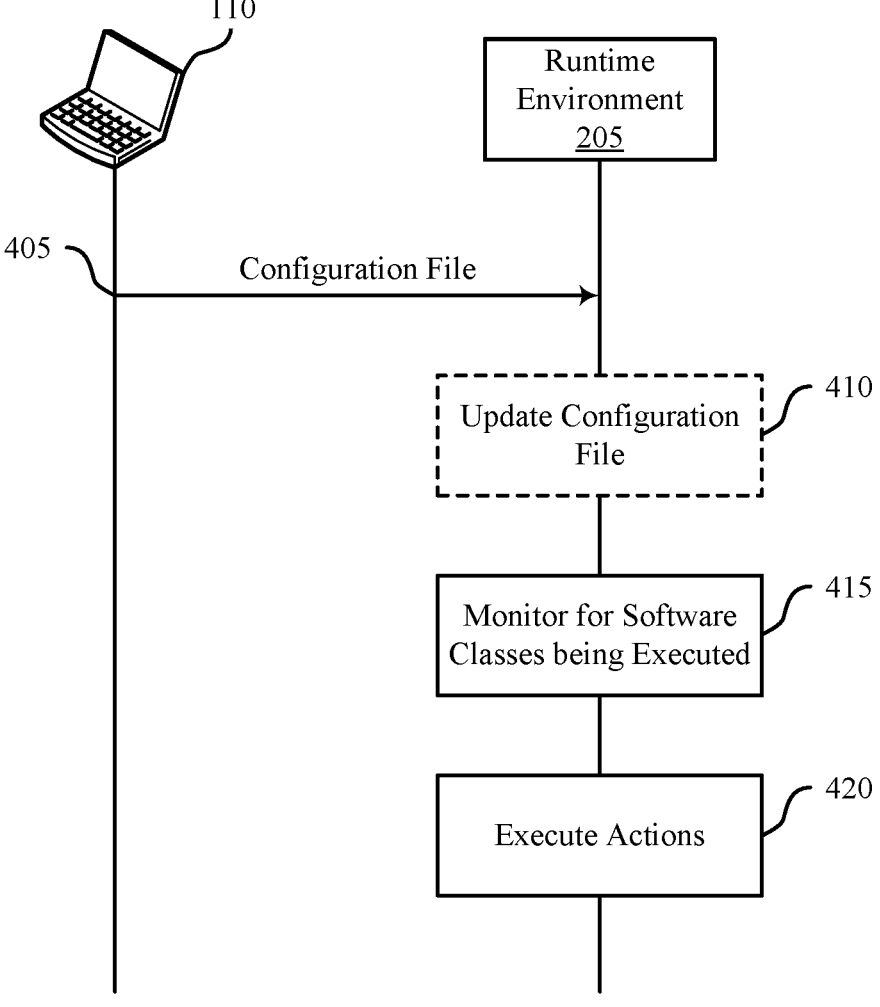
FIG. 4 shows an example of a process flow that supports vulnerability mitigation using a runtime agent in accordance with aspects of the present disclosure.

FIG. 4 shows an example of a process flow 400 that supports vulnerability mitigation using a runtime agent in accordance with aspects of the present disclosure. In some examples, the process flow 400 may implement or may be implemented by the system 100, the computing system 200, and/or the computing system 300. The process flow may include a contact 110 and a runtime environment 205 which may be examples of devices or services described elsewhere herein including with reference to FIGS. 1 and 2.

In the following description of the process flow 400, the operations may be performed by the contact 110 and the runtime environment 205 in different orders or at different times. Some operations may also be left out of the process flow 400, or other operations may be added. Although the process flow 400 may be described as being performed by the contact 110 and the runtime environment 205, some aspects of some operations may also be performed by other devices, services, or models described elsewhere herein including with reference to FIGS. 1 and 2.

At 405, one or more identifiers corresponding to one or more named units of executable code may be obtained within a first runtime environment 205 from a first configuration file. In some examples, a runtime agent may be configured within the first runtime environment 205 to retrieve respective indications of the one or more named units of executable code from a data store for inclusion in the first configuration file. In some other examples, one or more user inputs for the one or more identifiers that correspond to the one or more named units of executable code may be received via a user interface, and the one or more identifiers for the one or more named units of executable code may be stored in the first configuration file based on receiving the one or more user inputs via the user interface. In some cases, the one or more identifiers corresponding to one or more named units of executable code included in the first configuration file may include respective identifiers for one or more software classes, respective indications of one or more software methods included in the one or more software classes, respective indications of one or more software functions, or any combination thereof. The identifiers may be the names of the classes (e.g., a file path), the names of the functions, the names of the methods, or the like. In some other cases, at least one named unit of executable code in the first configuration file may include an indication of at least one software method of a software class, and the at least one software method of the first computer program may be edited prior to an execution of the first computer program in the first runtime environment 205, such that a portion of executable code is prepended to the at least one software method. Additionally, or alternatively, a runtime agent of a first virtual machine included within the first runtime environment 205 may intercept the one or more named units of executable code and execute the one or more actions.

At 410, the first configuration file may be updated. For example, the configuration file may be periodically updated such as by retrieving the identifiers corresponding to the one or more named units of executable code from a datastore. In some cases, the configuration file is updated in response to booting of the runtime environment, booting of the agent, etc. In some cases, the first configuration file may be updated prior to, during, or after the first computer program being executed in the first runtime environment 205.

At 415, the loading of the one or more named units of the executable code by the first computer program executing within the first runtime environment 205 may be intercepted within the first runtime environment 205. At 420, one or more actions may be executed within the first runtime environment 205 based on the loading of the one or more named units of executable code by the first computer program being intercepted. In some examples, the runtime agent may also be configured to intercept the loading of the one or more named units of executable code based on obtaining the respective identifiers of the one or more named units of executable code. Additionally, or alternatively, executing the one or more actions may include logging a trace leading to the loading of the one or more named units of executable code by the first computer program. In some other examples, executing the one or more actions may include executing a first exception for the first computer program within the first runtime environment 205 based on the loading of the one or more named units of executable code by the first computer program and on a condition associated with on a condition associated with a timestamp that is associated with the first configuration file. Further, the one or more actions may impact the execution of the first computer program in the first runtime environment 205. In some cases, impacting execution of the first computer program may include throwing an exception, modifying the code by prepending a portion of code to a software method of a software class, logging a stack trace, or the like.

Figure 5:
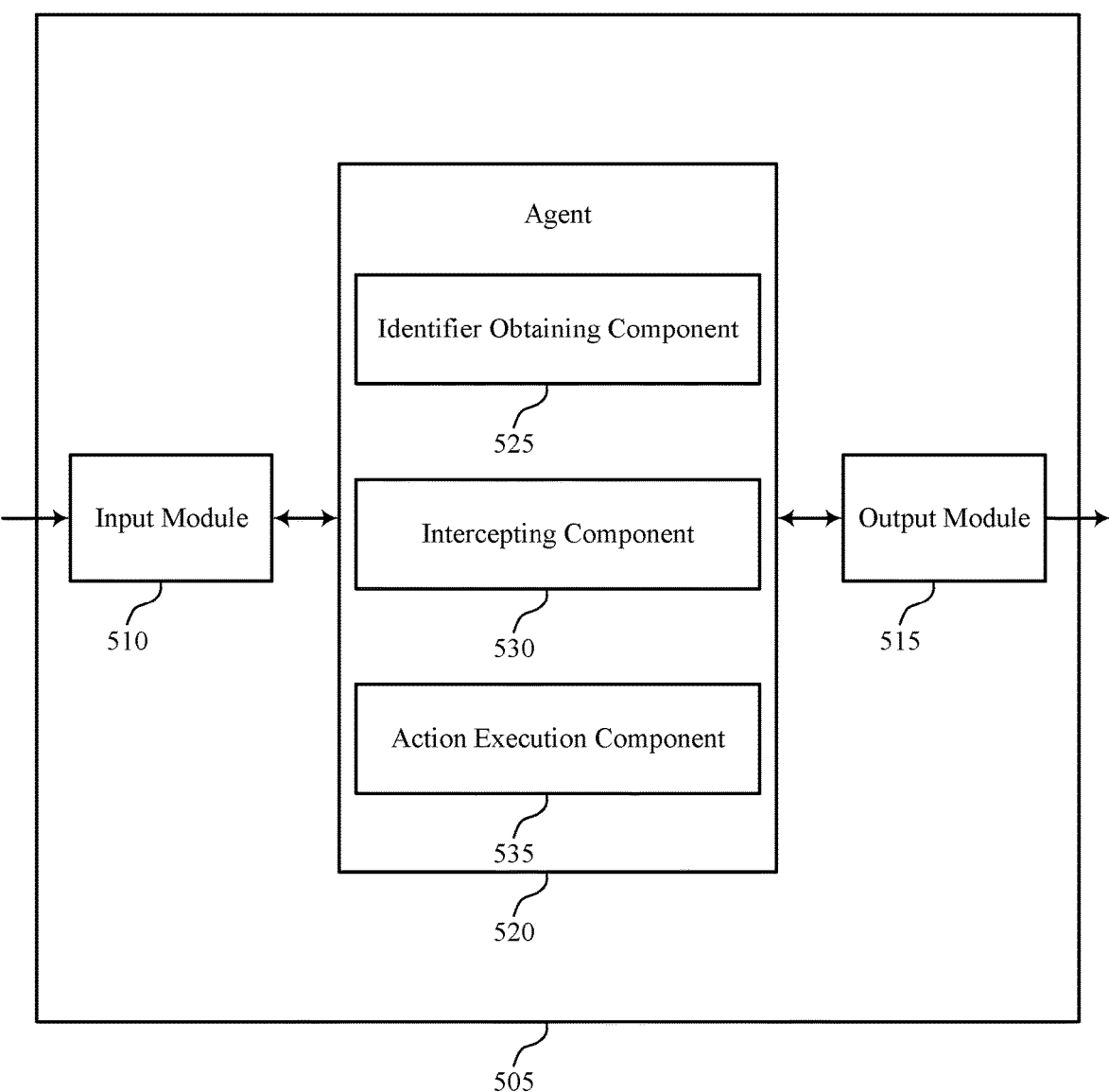
FIG. 5 shows a block diagram of an apparatus that supports vulnerability mitigation using a runtime agent in accordance with aspects of the present disclosure.

FIG. 5 shows a block diagram 500 of a device 505 that supports vulnerability mitigation using a runtime agent in accordance with aspects of the present disclosure. The device 505 may include an input module 510, an output module 515, and a runtime agent 520. The device 505, or one or more components of the device 505 (e.g., the input module 510, the output module 515, and the runtime agent 520), may include at least one processor, which may be coupled with at least one memory, to support the described techniques. Each of these components may be in communication with one another (e.g., via one or more buses).

The input module 510 may manage input signals for the device 505. For example, the input module 510 may identify input signals based on an interaction with a modem, a keyboard, a mouse, a touchscreen, or a similar device. These input signals may be associated with user input or processing at other components or devices. In some cases, the input module 510 may utilize an operating system such as iOS®, ANDROID®, MS-DOS®, MS-WINDOWS®, OS/2®, UNIX®, LINUX®, or another known operating system to handle input signals. The input module 510 may send aspects of these input signals to other components of the device 505 for processing. For example, the input module 510 may transmit input signals to the runtime agent 520 to support vulnerability mitigation using a runtime agent. In some cases, the input module 510 may be a component of an input/output (I/O) controller 710 as described with reference to FIG. 7.

The output module 515 may manage output signals for the device 505. For example, the output module 515 may receive signals from other components of the device 505, such as the runtime agent 520, and may transmit these signals to other components or devices. In some examples, the output module 515 may transmit output signals for display in a user interface, for storage in a database or data store, for further processing at a server or server cluster, or for any other processes at any number of devices or systems. In some cases, the output module 515 may be a component of an I/O controller 710 as described with reference to FIG. 7.

For example, the runtime agent 520 may include an identifier obtaining component 525, an intercepting component 530, an action execution component 535, or any combination thereof. In some examples, the runtime agent 520, or various components thereof, may be configured to perform various operations (e.g., receiving, monitoring, transmitting) using or otherwise in cooperation with the input module 510, the output module 515, or both. For example, the runtime agent 520 may receive information from the input module 510, send information to the output module 515, or be integrated in combination with the input module 510, the output module 515, or both to receive information, transmit information, or perform various other operations as described herein.

The identifier obtaining component 525 may be configured to support obtaining, within a first runtime environment, one or more identifiers corresponding to one or more named units of executable code from a first configuration file. The intercepting component 530 may be configured to support intercepting, within the first runtime environment, a loading of the one or more named units of executable code by a first computer program executing within the first runtime environment. The action execution component 535 may be configured to support executing, within the first runtime environment, one or more actions based on intercepting the loading of the one or more named units of executable code by the first computer program, where the one or more actions impact execution of the first computer program in the first runtime environment.

Figure 6:
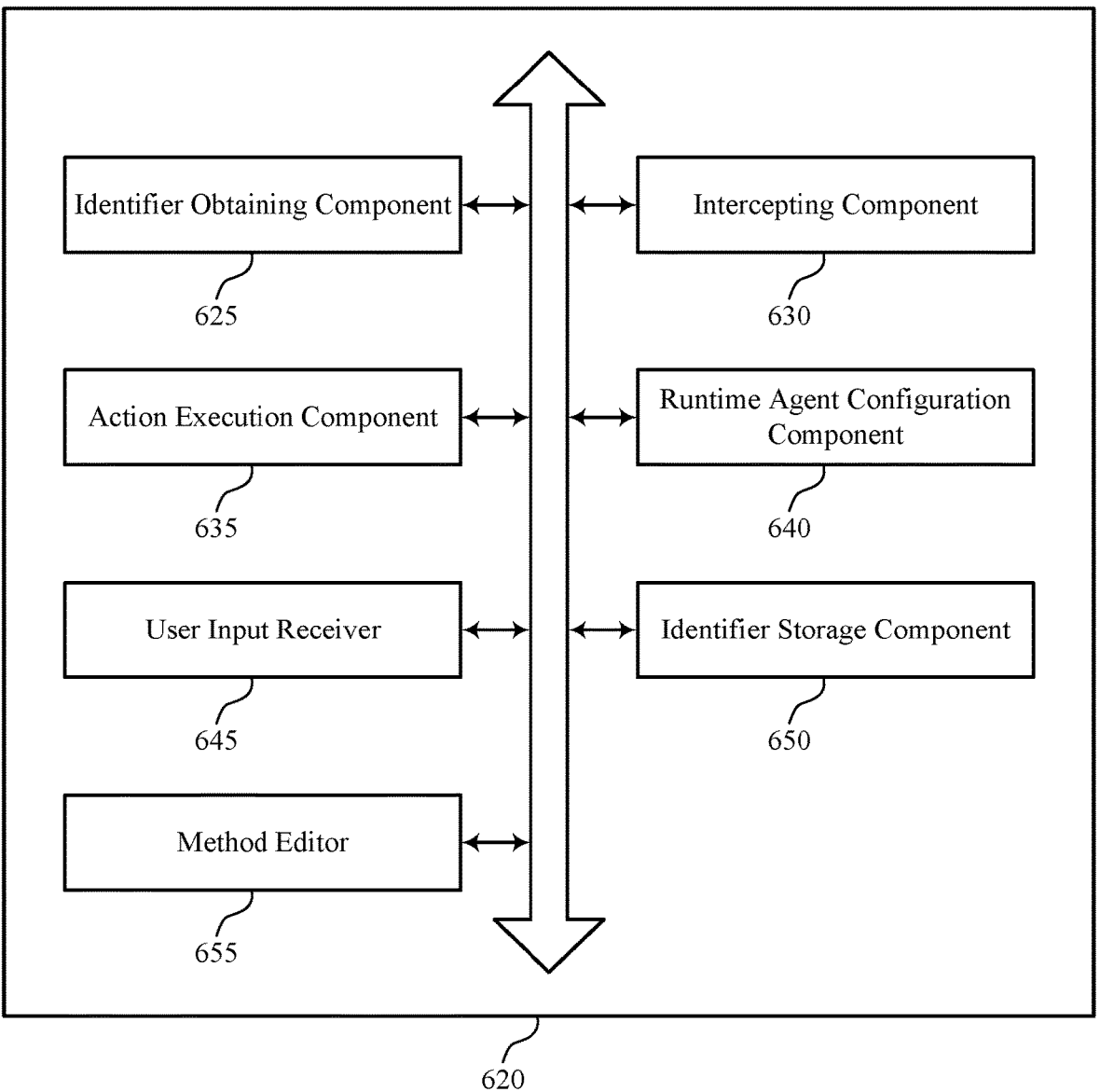
FIG. 6 shows a block diagram of a runtime agent that supports vulnerability mitigation using a runtime agent in accordance with aspects of the present disclosure.

FIG. 6 shows a block diagram 600 of a runtime agent 620 that supports vulnerability mitigation using a runtime agent in accordance with aspects of the present disclosure. The runtime agent 620 may be an example of aspects of a runtime agent or a runtime agent 520, or both, as described herein. The runtime agent 620, or various components thereof, may be an example of means for performing various aspects of vulnerability mitigation using a runtime agent as described herein. For example, the runtime agent 620 may include an identifier obtaining component 625, an intercepting component 630, an action execution component 635, a runtime agent configuration component 640, a user input receiver 645, an identifier storage component 650, a method editor 655, or any combination thereof. Each of these components, or components of subcomponents thereof (e.g., one or more processors, one or more memories), may communicate, directly or indirectly, with one another (e.g., via one or more buses).

The identifier obtaining component 625 may be configured to support obtaining, within a first runtime environment, one or more identifiers corresponding to one or more named units of executable code from a first configuration file. The intercepting component 630 may be configured to support intercepting, within the first runtime environment, a loading of the one or more named units of executable code by a first computer program executing within the first runtime environment. The action execution component 635 may be configured to support executing, within the first runtime environment, one or more actions based on intercepting the loading of the one or more named units of executable code by the first computer program, where the one or more actions impact execution of the first computer program in the first runtime environment.

In some examples, the runtime agent configuration component 640 may be configured to support configuring, within the first runtime environment a runtime agent to obtain respective identifiers of the one or more named units of executable code from the first configuration file for monitoring, where the first configuration file is periodically updated.

In some examples, the first configuration file is updated prior to, during, or after the first computer program being executed in the first runtime environment.

In some examples, the runtime agent is configured to intercept the loading of the one or more named units of executable code based on obtaining the respective identifiers of the one or more named units of executable code.

In some examples, the runtime agent configuration component 640 may be configured to support configuring, within the first runtime environment, a runtime agent to retrieve respective indications of the one or more named units of executable code from a data store for inclusion in the first configuration file.

In some examples, the user input receiver 645 may be configured to support receiving, via a user interface, one or more user inputs for the one or more identifiers that correspond to the one or more named units of executable code. In some examples, the identifier storage component 650 may be configured to support causing the one or more identifiers for the one or more named units of executable code to be stored in the first configuration file based on receiving the one or more user inputs via the user interface.

In some examples, the one or more identifiers corresponding to one or more named units of executable code included in the first configuration file include respective identifiers for one or more software classes, respective indications of one or more software methods included in the one or more software classes, respective indications of one or more software functions, or any combination thereof.

In some examples, at least one named unit of executable code in first configuration file includes an indication of at least one software method of a software class, and the method editor 655 may be configured to support editing, prior to the first computer program being executed in the first runtime environment, the at least one software method such that a portion of executable code is prepended to the at least one software method.

In some examples, to support executing the one or more actions, the action execution component 635 may be configured to support logging a trace leading to the loading of the one or more named units of executable code by the first computer program.

In some examples, to support executing the one or more actions, the action execution component 635 may be configured to support executing a first exception for the first computer program within the first runtime environment based on the loading of the one or more named units of executable code by the first computer program and on a condition associated with a timestamp that is associated with the first configuration file.

In some examples, the first runtime environment includes a first virtual machine that includes a runtime agent that intercepts the one or more named units of executable code and executes the one or more actions.

Figure 7:
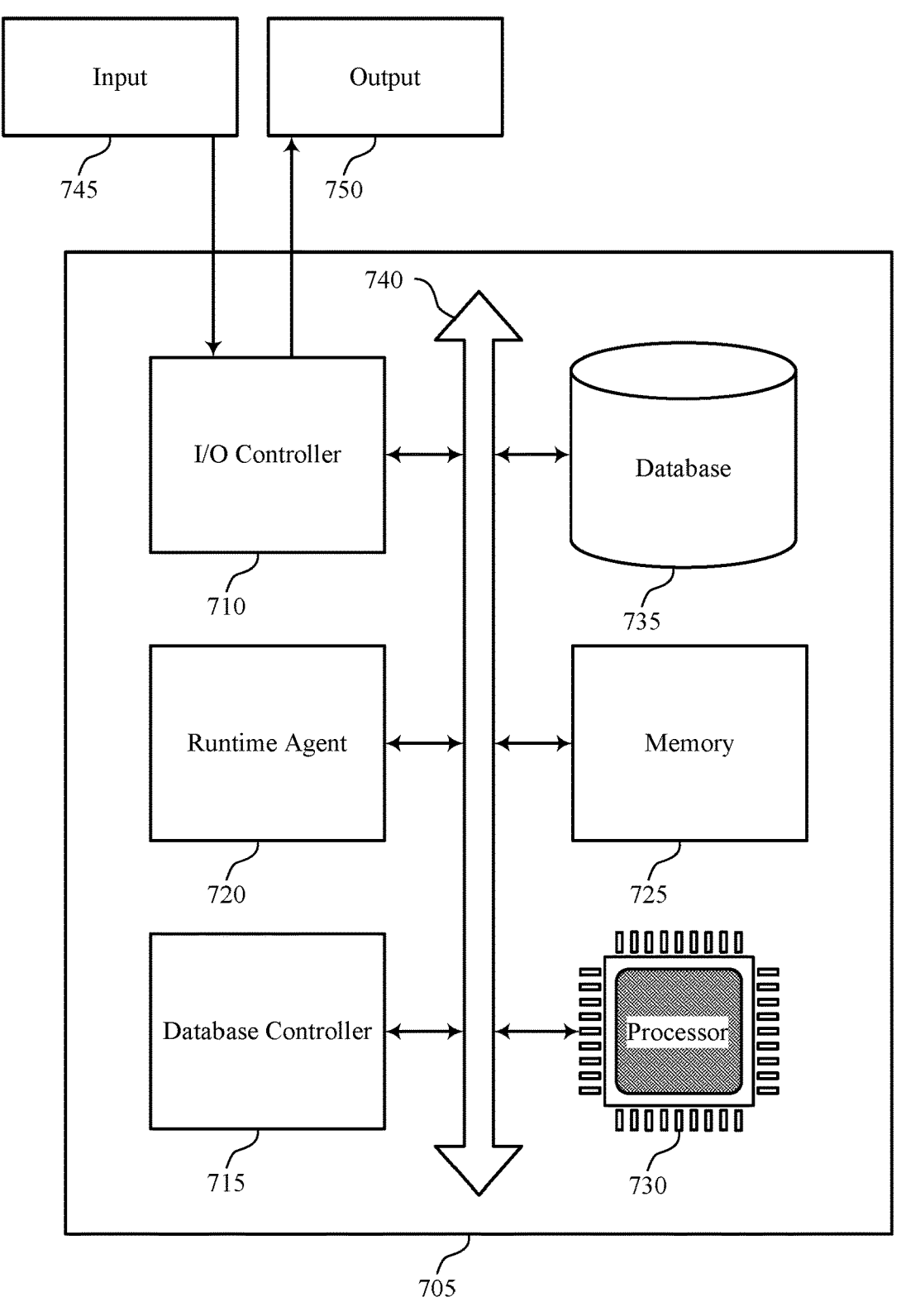
FIG. 7 shows a diagram of a system including a device that supports vulnerability mitigation using a runtime agent in accordance with aspects of the present disclosure.

FIG. 7 shows a diagram of a system 700 including a device 705 that supports vulnerability mitigation using a runtime agent in accordance with aspects of the present disclosure. The device 705 may be an example of or include the components of a device 505 as described herein. The device 705 may include components for bi-directional data communications including components for transmitting and receiving communications, such as a runtime agent 720, an I/O controller 710, a database controller 715, at least one memory 725, at least one processor 730, and a database 735. These components may be in electronic communication or otherwise coupled (e.g., operatively, communicatively, functionally, electronically, electrically) via one or more buses (e.g., a bus 740).

The I/O controller 710 may manage input signals 745 and output signals 750 for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. In other cases, the I/O controller 710 may represent or interact with a modem, a keyboard, a mouse, a touchscreen, or a similar device. In some cases, the I/O controller 710 may be implemented as part of a processor 730. In some examples, a user may interact with the device 705 via the I/O controller 710 or via hardware components controlled by the I/O controller 710.

The database controller 715 may manage data storage and processing in a database 735. In some cases, a user may interact with the database controller 715. In other cases, the database controller 715 may operate automatically without user interaction. The database 735 may be an example of a single database, a distributed database, multiple distributed databases, a data store, a data lake, or an emergency backup database.

Memory 725 may include random-access memory (RAM) and read-only memory (ROM). The memory 725 may store computer-readable, computer-executable software including instructions that, when executed, cause at least one processor 730 to perform various functions described herein. In some cases, the memory 725 may contain, among other things, a basic I/O system (BIOS) which may control basic hardware or software operation such as the interaction with peripheral components or devices. The memory 725 may be an example of a single memory or multiple memories. For example, the device 705 may include one or more memories 725.

The processor 730 may include an intelligent hardware device (e.g., a general-purpose processor, a digital signal processor (DSP), a central processing unit (CPU), a microcontroller, an application-specific integrated circuit (ASIC), a field-programmable gate array (FPGA), a programmable logic device, a discrete gate or transistor logic component, a discrete hardware component, or any combination thereof). In some cases, the processor 730 may be configured to operate a memory array using a memory controller. In other cases, a memory controller may be integrated into the processor 730. The processor 730 may be configured to execute computer-readable instructions stored in at least one memory 725 to perform various functions (e.g., functions or tasks supporting vulnerability mitigation using a runtime agent). The processor 730 may be an example of a single processor or multiple processors. For example, the device 705 may include one or more processors 730.

For example, the runtime agent 720 may be configured to support obtaining, within a first runtime environment, one or more identifiers corresponding to one or more named units of executable code from a first configuration file. The runtime agent 720 may be configured to support intercepting, within the first runtime environment, a loading of the one or more named units of executable code by a first computer program executing within the first runtime environment. The runtime agent 720 may be configured to support executing, within the first runtime environment, one or more actions based on intercepting the loading of the one or more named units of executable code by the first computer program, where the one or more actions impact execution of the first computer program in the first runtime environment.

By including or configuring the runtime agent 720 in accordance with examples as described herein, the device 705 may support techniques for the runtime agent 720 to intercept the loading of vulnerable executable code within a runtime environment to support a more secure system and to reduce unnecessary patching procedures, thus saving computation resources.

FIG. 8 shows a flowchart illustrating a method 800 that supports vulnerability mitigation using a runtime agent in accordance with aspects of the present disclosure. The operations of the method 800 may be implemented by a runtime environment or its components as described herein. For example, the operations of the method 800 may be performed by a runtime environment as described with reference to FIGS. 1 through 7. In some examples, a runtime environment may execute a set of instructions to control the functional elements of the runtime environment to perform the described functions. Additionally, or alternatively, the runtime environment may perform aspects of the described functions using special-purpose hardware.

At 805, the method may include obtaining, within a first runtime environment, one or more identifiers corresponding to one or more named units of executable code from a first configuration file. The operations of block 805 may be performed in accordance with examples as disclosed herein. In some examples, aspects of the operations of 805 may be performed by an identifier obtaining component 625 as described with reference to FIG. 6.

At 810, the method may include intercepting, within the first runtime environment, a loading of the one or more named units of executable code by a first computer program executing within the first runtime environment. The operations of block 810 may be performed in accordance with examples as disclosed herein. In some examples, aspects of the operations of 810 may be performed by an intercepting component 630 as described with reference to FIG. 6.

At 815, the method may include executing, within the first runtime environment, one or more actions based on intercepting the loading of the one or more named units of executable code by the first computer program, where the one or more actions impact execution of the first computer program in the first runtime environment. The operations of block 815 may be performed in accordance with examples as disclosed herein. In some examples, aspects of the operations of 815 may be performed by an action execution component 635 as described with reference to FIG. 6.

FIG. 9 shows a flowchart illustrating a method 900 that supports vulnerability mitigation using a runtime agent in accordance with aspects of the present disclosure. The operations of the method 900 may be implemented by a runtime agent or its components as described herein. For example, the operations of the method 900 may be performed by a runtime agent as described with reference to FIGS. 1 through 7. In some examples, a runtime agent may execute a set of instructions to control the functional elements of the runtime agent to perform the described functions. Additionally, or alternatively, the runtime agent may perform aspects of the described functions using special-purpose hardware.

At 905, the method may include receiving, via a user interface, one or more user inputs for one or more identifiers that correspond to one or more named units of executable code. The operations of block 905 may be performed in accordance with examples as disclosed herein. In some examples, aspects of the operations of 905 may be performed by 625 as described with reference to FIG. 6.

At 910, the method may include causing the one or more identifiers for the one or more named units of executable code to be stored in a first configuration file based on receiving the one or more user inputs via the user interface. The operations of block 910 may be performed in accordance with examples as disclosed herein. In some examples, aspects of the operations of 910 may be performed by 625 as described with reference to FIG. 6.

At 915, the method may include obtaining, within a first runtime environment, the one or more identifiers corresponding to the one or more named units of executable code from the first configuration file. The operations of block 915 may be performed in accordance with examples as disclosed herein. In some examples, aspects of the operations of 915 may be performed by 625 as described with reference to FIG. 6.

At 920, the method may include intercepting, within the first runtime environment, a loading of the one or more named units of executable code by a first computer program executing within the first runtime environment. The operations of block 920 may be performed in accordance with examples as disclosed herein. In some examples, aspects of the operations of 920 may be performed by 625 as described with reference to FIG. 6.

At 925, the method may include executing, within the first runtime environment, one or more actions based on intercepting the loading of the one or more named units of executable code by the first computer program, where the one or more actions impact execution of the first computer program in the first runtime environment. The operations of block 925 may be performed in accordance with examples as disclosed herein. In some examples, aspects of the operations of 925 may be performed by 625 as described with reference to FIG. 6.

FIG. 10 shows a flowchart illustrating a method 1000 that supports vulnerability mitigation using a runtime agent in accordance with aspects of the present disclosure. The operations of the method 1000 may be implemented by a runtime agent or its components as described herein. For example, the operations of the method 1000 may be performed by a runtime agent as described with reference to FIGS. 1 through 7. In some examples, a runtime agent may execute a set of instructions to control the functional elements of the runtime agent to perform the described functions. Additionally, or alternatively, the runtime agent may perform aspects of the described functions using special-purpose hardware.

At 1005, the method may include obtaining, within a first runtime environment, one or more identifiers corresponding to one or more named units of executable code from a first configuration file. The operations of block 1005 may be performed in accordance with examples as disclosed herein. In some examples, aspects of the operations of 1005 may be performed by 625 as described with reference to FIG. 6.

At 1010, the method may include intercepting, within the first runtime environment, a loading of the one or more named units of executable code by a first computer program executing within the first runtime environment. The operations of block 1010 may be performed in accordance with examples as disclosed herein. In some examples, aspects of the operations of 1010 may be performed by 625 as described with reference to FIG. 6.

At 1015, the method may include executing, within the first runtime environment, one or more actions based on intercepting the loading of the one or more named units of executable code by the first computer program, where the one or more actions impact execution of the first computer program in the first runtime environment. The operations of block 1015 may be performed in accordance with examples as disclosed herein. In some examples, aspects of the operations of 1015 may be performed by 625 as described with reference to FIG. 6.

At 1020, the method may include editing, prior to the first computer program being executed in the first runtime environment, the at least one software method such that a portion of executable code is prepended to the at least one software method. The operations of block 1020 may be performed in accordance with examples as disclosed herein. In some examples, aspects of the operations of 1020 may be performed by 625 as described with reference to FIG. 6.

A method by an apparatus is described. The method may include obtaining, within a first runtime environment, one or more identifiers corresponding to one or more named units of executable code from a first configuration file, intercepting, within the first runtime environment, a loading of the one or more named units of executable code by a first computer program executing within the first runtime environment, and executing, within the first runtime environment, one or more actions based on intercepting the loading of the one or more named units of executable code by the first computer program, where the one or more actions impact execution of the first computer program in the first runtime environment.

An apparatus is described. The apparatus may include one or more memories storing processor executable code, and one or more processors coupled with the one or more memories. The one or more processors may individually or collectively operable to execute the code to cause the apparatus to obtain, within a first runtime environment, one or more identifiers corresponding to one or more named units of executable code from a first configuration file, intercept, within the first runtime environment, a loading of the one or more named units of executable code by a first computer program executing within the first runtime environment, and execute, within the first runtime environment, one or more actions based on intercepting the loading of the one or more named units of executable code by the first computer program, where the one or more actions impact execution of the first computer program in the first runtime environment.

Another apparatus is described. The apparatus may include means for obtaining, within a first runtime environment, one or more identifiers corresponding to one or more named units of executable code from a first configuration file, means for intercepting, within the first runtime environment, a loading of the one or more named units of executable code by a first computer program executing within the first runtime environment, and means for executing, within the first runtime environment, one or more actions based on intercepting the loading of the one or more named units of executable code by the first computer program, where the one or more actions impact execution of the first computer program in the first runtime environment.

A non-transitory computer-readable medium storing code is described. The code may include instructions executable by one or more processors to obtain, within a first runtime environment, one or more identifiers corresponding to one or more named units of executable code from a first configuration file, intercept, within the first runtime environment, a loading of the one or more named units of executable code by a first computer program executing within the first runtime environment, and execute, within the first runtime environment, one or more actions based on intercepting the loading of the one or more named units of executable code by the first computer program, where the one or more actions impact execution of the first computer program in the first runtime environment.

In some examples of the method, apparatus, and non-transitory computer-readable medium described herein, configuring, within the first runtime environment a runtime agent to obtain respective identifiers of the one or more named units of executable code from the first configuration file for monitoring, where the first configuration file may be periodically updated.

In some examples of the method, apparatus, and non-transitory computer-readable medium described herein, the first configuration file may be updated prior to, during, or after the first computer program being executed in the first runtime environment.

In some examples of the method, apparatus, and non-transitory computer-readable medium described herein, the runtime agent may be configured to intercept the loading of the one or more named units of executable code based on obtaining the respective identifiers of the one or more named units of executable code.

In some examples of the method, apparatus, and non-transitory computer-readable medium described herein, configuring, within the first runtime environment, a runtime agent to retrieve respective indications of the one or more named units of executable code from a data store for inclusion in the first configuration file.

Some examples of the method, apparatus, and non-transitory computer-readable medium described herein may further include operations, features, means, or instructions for receiving, via a user interface, one or more user inputs for the one or more identifiers that correspond to the one or more named units of executable code and causing the one or more identifiers for the one or more named units of executable code to be stored in the first configuration file based on receiving the one or more user inputs via the user interface.

In some examples of the method, apparatus, and non-transitory computer-readable medium described herein, the one or more identifiers corresponding to one or more named units of executable code included in the first configuration file include respective identifiers for one or more software classes, respective indications of one or more software methods included in the one or more software classes, respective indications of one or more software functions, or any combination thereof.

In some examples of the method, apparatus, and non-transitory computer-readable medium described herein, at least one named unit of executable code in first configuration file includes an indication of at least one software method of a software class, and the method, apparatuses, and non-transitory computer-readable medium may include further operations, features, means, or instructions for editing, prior to the first computer program being executed in the first runtime environment, the at least one software method such that a portion of executable code may be prepended to the at least one software method.

In some examples of the method, apparatus, and non-transitory computer-readable medium described herein, executing the one or more actions may include operations, features, means, or instructions for logging a trace leading to the loading of the one or more named units of executable code by the first computer program.

In some examples of the method, apparatus, and non-transitory computer-readable medium described herein, executing the one or more actions may include operations, features, means, or instructions for executing a first exception for the first computer program within the first runtime environment based on the loading of the one or more named units of executable code by the first computer program and on a condition associated with a timestamp that is associated with the first configuration file.

In some examples of the method, apparatus, and non-transitory computer-readable medium described herein, the first runtime environment includes a first virtual machine that includes a runtime agent that intercepts the one or more named units of executable code and executes the one or more actions.

The following provides an overview of aspects of the present disclosure:

Aspect 1: A method, comprising: obtaining, within a first runtime environment, one or more identifiers corresponding to one or more named units of executable code from a first configuration file; intercepting, within the first runtime environment, a loading of the one or more named units of executable code by a first computer program executing within the first runtime environment; and executing, within the first runtime environment, one or more actions based at least in part on intercepting the loading of the one or more named units of executable code by the first computer program, wherein the one or more actions impact execution of the first computer program in the first runtime environment.

Aspect 2: The method of aspect 1, further comprising: configuring, within the first runtime environment a runtime agent to obtain respective identifiers of the one or more named units of executable code from the first configuration file for monitoring, wherein the first configuration file is periodically updated.

Aspect 3: The method of aspect 2, wherein the first configuration file is updated prior to, during, or after the first computer program being executed in the first runtime environment.

Aspect 4: The method of any of aspects 2 through 3, wherein the runtime agent is configured to intercept the loading of the one or more named units of executable code based at least in part on obtaining the respective identifiers of the one or more named units of executable code.

Aspect 5: The method of any of aspects 1 through 4, further comprising: configuring, within the first runtime environment, a runtime agent to retrieve respective indications of the one or more named units of executable code from a data store for inclusion in the first configuration file.

Aspect 6: The method of any of aspects 1 through 5, further comprising: receiving, via a user interface, one or more user inputs for the one or more identifiers that correspond to the one or more named units of executable code; and causing the one or more identifiers for the one or more named units of executable code to be stored in the first configuration file based at least in part on receiving the one or more user inputs via the user interface.

Aspect 7: The method of any of aspects 1 through 6, wherein the one or more identifiers corresponding to one or more named units of executable code included in the first configuration file comprise respective identifiers for one or more software classes, respective indications of one or more software methods included in the one or more software classes, respective indications of one or more software functions, or any combination thereof.

Aspect 8: The method of any of aspects 1 through 7, wherein at least one named unit of executable code in first configuration file comprises an indication of at least one software method of a software class, the method further comprising: editing, prior to the first computer program being executed in the first runtime environment, the at least one software method such that a portion of executable code is prepended to the at least one software method.

Aspect 9: The method of any of aspects 1 through 8, wherein executing the one or more actions comprises: logging a trace leading to the loading of the one or more named units of executable code by the first computer program.

Aspect 10: The method of any of aspects 1 through 9, wherein executing the one or more actions comprises: executing a first exception for the first computer program within the first runtime environment based at least in part on the loading of the one or more named units of executable code by the first computer program and on a condition associated with a timestamp that is associated with the first configuration file.

Aspect 11: The method of any of aspects 1 through 10, wherein the first runtime environment comprises a first virtual machine that includes a runtime agent that intercepts the one or more named units of executable code and executes the one or more actions.

Aspect 12: An apparatus comprising one or more memories storing processor-executable code, and one or more processors coupled with the one or more memories and individually or collectively operable to execute the code to cause the apparatus to perform a method of any of aspects 1 through 11.

Aspect 13: An apparatus comprising at least one means for performing a method of any of aspects 1 through 11.

Aspect 14: A non-transitory computer-readable medium storing code the code comprising instructions executable by one or more processors to perform a method of any of aspects 1 through 11.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable ROM (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method performed by a first runtime environment, comprising:

obtaining, via a runtime agent within the first runtime environment, one or more identifiers corresponding to one or more named units of executable code from a first configuration file, wherein the runtime agent is configured to block execution of the one or more named units of executable code that correspond to the one or more identifiers;

intercepting, within the first runtime environment, a loading of the one or more named units of executable code by a first computer program executing within the first runtime environment; and executing, within the first runtime environment, one or more actions based at least in part on intercepting the loading of the one or more named units of executable code by the first computer program, wherein the one or more actions impact execution of the first computer program in the first runtime environment.

2. The method of claim 1, further comprising:

configuring, within the first runtime environment, the runtime agent to obtain respective identifiers of the one or more named units of executable code from the first configuration file for monitoring, wherein the first configuration file is periodically updated.

3. The method of claim 2, wherein the first configuration file is updated prior to, during, or after the first computer program being executed in the first runtime environment.

4. The method of claim 2, wherein the runtime agent is configured to intercept the loading of the one or more named units of executable code based at least in part on obtaining the respective identifiers of the one or more named units of executable code.

5. The method of claim 1, further comprising:

configuring, within the first runtime environment, the runtime agent to retrieve respective indications of the one or more named units of executable code from a data store for inclusion in the first configuration file.

6. The method of claim 1, further comprising:

receiving, via a user interface, one or more user inputs for the one or more identifiers that correspond to the one or more named units of executable code; and causing the one or more identifiers for the one or more named units of executable code to be stored in the first configuration file based at least in part on receiving the one or more user inputs via the user interface.

7. The method of claim 1, wherein the one or more identifiers corresponding to the one or more named units of executable code included in the first configuration file comprise respective identifiers for one or more software classes, respective indications of one or more software methods included in the one or more software classes, respective indications of one or more software functions, or any combination thereof.

8. The method of claim 1, wherein at least one named unit of executable code in the first configuration file comprises an indication of at least one software method of a software class, the method further comprising:

editing, prior to the first computer program being executed in the first runtime environment, the at least one software method such that a portion of executable code is prepended to the at least one software method.

9. The method of claim 1, wherein executing the one or more actions comprises:

logging a trace leading to the loading of the one or more named units of executable code by the first computer program.

10. The method of claim 1, wherein executing the one or more actions comprises:

executing a first exception for the first computer program within the first runtime environment based at least in part on the loading of the one or more named units of executable code by the first computer program and on a condition associated with a timestamp that is associated with the first configuration file.

11. The method of claim 1, wherein the first runtime environment comprises a first virtual machine that includes the runtime agent that intercepts the one or more named units of executable code and executes the one or more actions.

12. An apparatus, comprising:

one or more memories storing processor-executable code; and one or more processors coupled with the one or more memories and individually or collectively operable to execute the code to cause the apparatus to:

obtain, via a runtime agent within a first runtime environment, one or more identifiers corresponding to one or more named units of executable code from a first configuration file, wherein the runtime agent is configured to block execution of the one or more named units of executable code that correspond to the one or more identifiers;

intercept, within the first runtime environment, a loading of the one or more named units of executable code by a first computer program executing within the first runtime environment; and execute, within the first runtime environment, one or more actions based at least in part on intercepting the loading of the one or more named units of executable code by the first computer program, wherein the one or more actions impact execution of the first computer program in the first runtime environment.

13. The apparatus of claim 12, wherein the one or more processors are individually or collectively further operable to execute the code to cause the apparatus to:

configure, within the first runtime environment, the runtime agent to obtain respective identifiers of the one or more named units of executable code from the first configuration file for monitoring, wherein the first configuration file is periodically updated.

14. The apparatus of claim 13, wherein the runtime agent is configured to intercept the loading of the one or more named units of executable code based at least in part on obtaining the respective identifiers of the one or more named units of executable code.

15. The apparatus of claim 12, wherein the one or more identifiers corresponding to the one or more named units of executable code included in the first configuration file comprise respective identifiers for one or more software classes, respective indications of one or more software methods included in the one or more software classes, respective indications of one or more software functions, or any combination thereof.

16. The apparatus of claim 12, wherein at least one named unit of executable code in the first configuration file comprises an indication of at least one software method of a software class, and the one or more processors are individually or collectively further operable to execute the code to cause the apparatus to:

edit, prior to the first computer program be executed in the first runtime environment, the at least one software method such that a portion of executable code is prepended to the at least one software method.

17. A non-transitory computer-readable medium storing code, the code comprising instructions executable by one or more processors to:

obtain, via a runtime agent within a first runtime environment, one or more identifiers corresponding to one or more named units of executable code from a first configuration file, wherein the runtime agent is configured to block execution of the one or more named units of executable code that correspond to the one or more identifiers;

intercept, within the first runtime environment, a loading of the one or more named units of executable code by a first computer program executing within the first runtime environment; and execute, within the first runtime environment, one or more actions based at least in part on intercepting the loading of the one or more named units of executable code by the first computer program, wherein the one or more actions impact execution of the first computer program in the first runtime environment.

18. The non-transitory computer-readable medium of claim 17, wherein the instructions are further executable by the one or more processors to:

configure, within the first runtime environment, the runtime agent to obtain respective identifiers of the one or more named units of executable code from the first configuration file for monitoring, wherein the first configuration file is periodically updated.

19. The non-transitory computer-readable medium of claim 18, wherein the runtime agent is configured to intercept the loading of the one or more named units of executable code based at least in part on obtaining the respective identifiers of the one or more named units of executable code.

20. The non-transitory computer-readable medium of claim 17, wherein at least one named unit of executable code in the first configuration file comprises an indication of at least one software method of a software class and the instructions are further executable by the one or more processors to:

edit, prior to the first computer program be executed in the first runtime environment, the at least one software method such that a portion of executable code is prepended to the at least one software method.

* * * * *